No. 847,927. PATENTED MAR. 19, 1907.
J. W. FINCH.
HAND CAR.
APPLICATION FILED DEC. 27, 1906.

2 SHEETS—SHEET 1.

WITNESSES
F. C. Barry
C. E. Trainor

INVENTOR
JOHN W. FINCH
BY Munn & Co.
ATTORNEYS

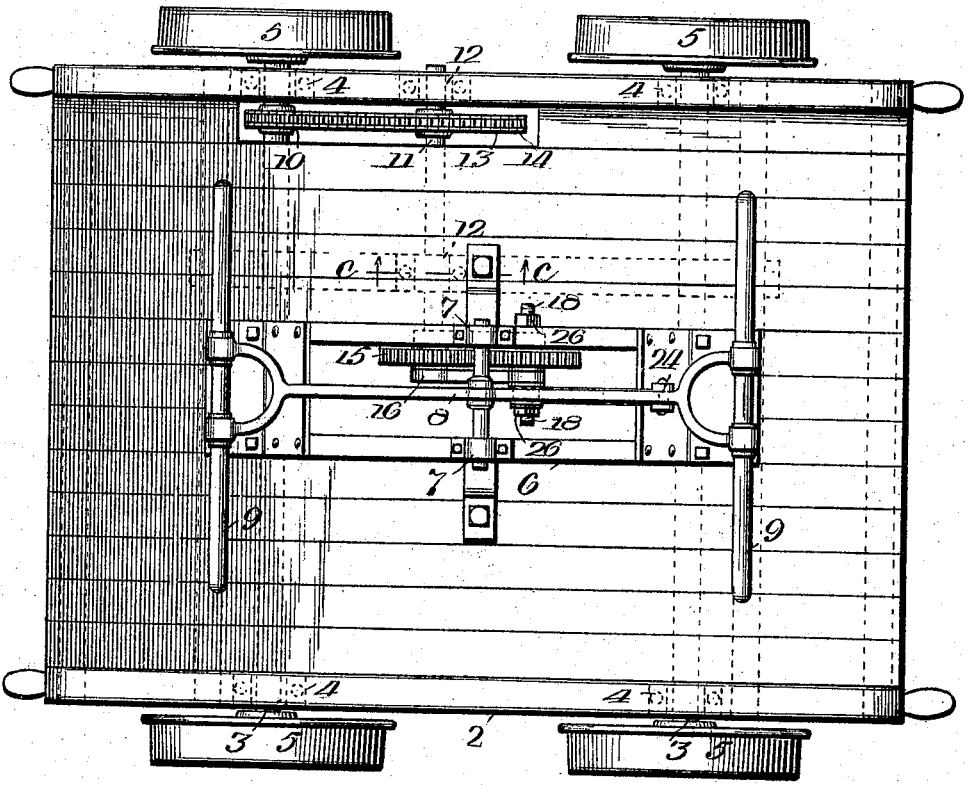

UNITED STATES PATENT OFFICE.

JOHN WALTER FINCH, OF ELIZABETH, MISSISSIPPI.

HAND-CAR.

No. 847,927.

Specification of Letters Patent.

Patented March 19, 1907.

Application filed December 27, 1906. Serial No. 349,647.

*To all whom it may concern:*

Be it known that I, JOHN WALTER FINCH, a citizen of the United States, and a resident of Elizabeth, in the county of Washington and State of Mississippi, have made certain new and useful Improvements in Hand-Cars, of which the following is a specification.

My invention is an improvement in hand-cars, and consists in certain novel constructions and combinations of parts hereinafter described and claimed.

Figure 1:
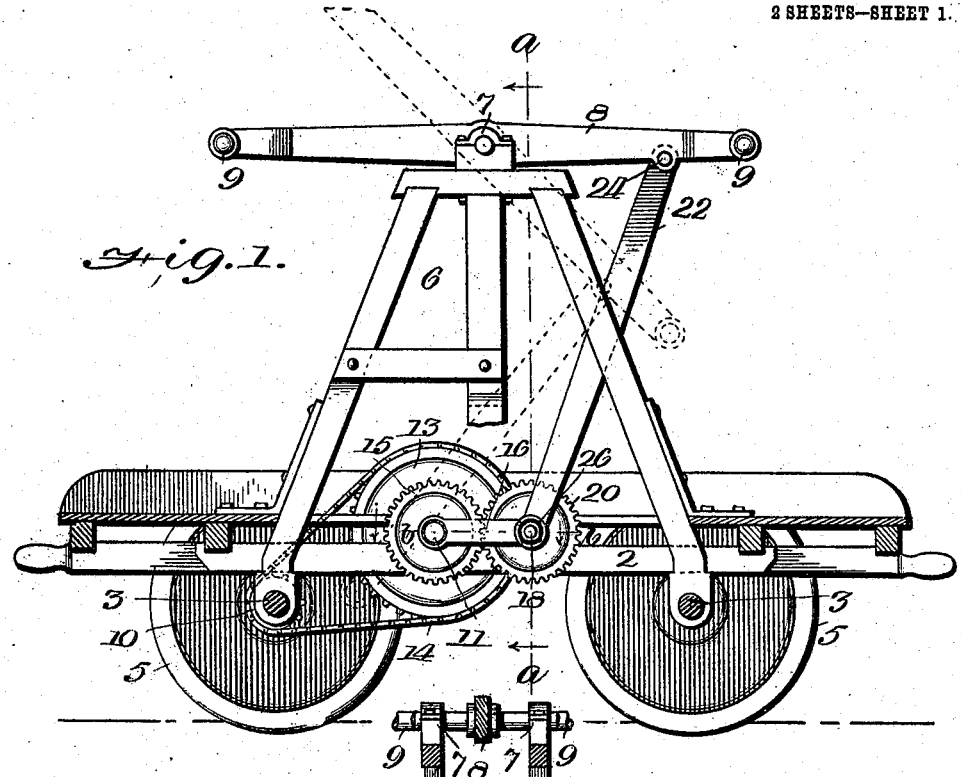
Figure 2:
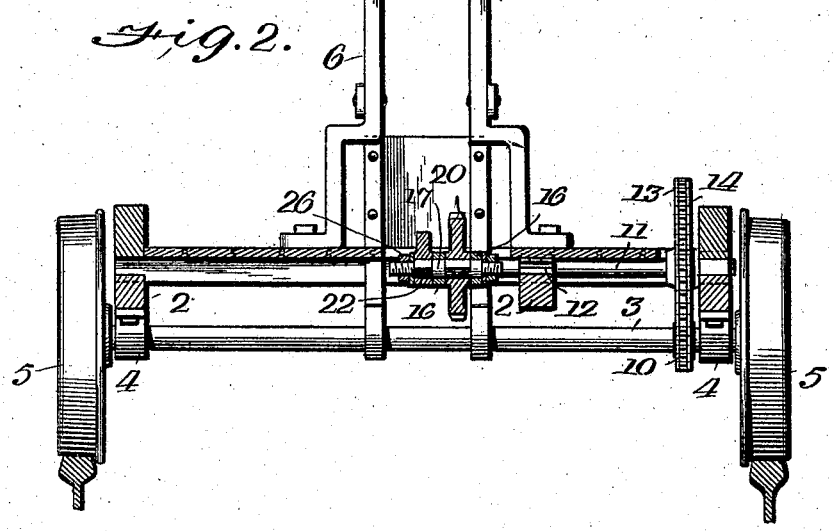

Referring to the drawings forming a part hereof, Figure 1 is a longitudinal section through my improved hand-car. Fig. 2 is a section on the line *a a* of Fig. 1. Fig. 3 is a plan view of the hand-car. Fig. 4 is a section on the line *b b* of Fig. 1, and Fig. 5 is a section on the line *c c* of Fig. 3.

In the present embodiment of my invention the hand-car is of ordinary construction, comprising a frame 2, provided with bearings 4, in which are journaled the axles 3, provided with flanged wheels 5. The frame is provided with the ordinary pedestal 6 at the center thereof, and on the pedestal are the bearings 7, in which is journaled the rock-lever 8, provided with ordinary handles 9. One of the axles 3 is provided with a sprocket-wheel 10 of relatively small diameter, connected by a sprocket-chain 14 with a sprocket-wheel 13 of relatively large diameter, secured to a counter-shaft 11, journaled in bearings 12 on the frame, and having keyed to the inner end thereof a gear-wheel 15.

A pair of spaced parallel arms 16 are journaled on the end of the counter-shaft, one of said arms being arranged upon each side of the gear-wheel 15, and in the free end of the arms is journaled a stub-shaft 17, having its ends reduced and screw-threaded, as at 18, and provided at its central portion between the arms with a squared portion 19, received in the correspondingly-shaped opening of a gear-wheel 20, meshing with the gear-wheel 15 before described. The inner end of the stub-shaft 17 is also provided with a squared portion 21, received in the correspondingly-shaped hole of the pitman 22, which is pivoted to one end of the rock-lever, as at 24, and washers 25 and nuts 26 are arranged on the reduced ends of the stub-shaft for securing the parts in their respective positions.

In operation when the rock-lever is rocked upon its bearings the parallel arms 16 are rotated about the counter-shaft 11, and since the stub-shaft is rigid with the pitman and the gear-wheel 20 is rigid with the stub-shaft the gear-wheel 15 is constrained to rotate and carries the shaft 11 therewith at a considerably higher speed than were the parallel arms secured directly to the shaft 11 and acting thereon as a crank-arm, and since the sprocket-wheel 13 is of relatively greater diameter than the sprocket-wheel 10 this movement is further multiplied on the axle 3.

I claim—

1. A hand-car, comprising a frame, axles journaled thereon, wheels secured to the ends of the axles, a sprocket-wheel rigid with one of the axles, a counter-shaft journaled on the frame, a sprocket-wheel secured thereto, a sprocket-chain connecting said sprocket-wheels, a pair of spaced parallel arms journaled on the end of the counter-shaft, a gear-wheel secured to the counter-shaft between the arms, a stub-shaft journaled in the free ends of the arms, a gear-wheel rigid with the stub-shaft between the arms and meshing with the first-named gear-wheel, said stub-shaft having a squared portion outside of the arms, a pitman having a square opening to receive said squared portion, nuts threaded on the ends of the stub-shaft for retaining the parts in position, and means connected with the pitman for operating the same.

2. A hand-car comprising a frame, axles journaled thereon, wheels secured to the ends of the axles, a counter-shaft journaled on the frame, a pair of spaced parallel arms journaled on the counter-shaft, a gear-wheel secured to the shaft between the arms, a stub-shaft journaled in the free ends of the arms, a gear-wheel rigid with the stub-shaft between the arms and meshing with the first-named gear-wheel, a pitman rigidly secured to the stub-shaft outside of the arms, means connected with the pitman for operating the same, and a driving connection between the counter-shaft and one of the axles.

3. A hand-car comprising a frame, axles journaled thereon, wheels secured to the ends of the axles, a counter-shaft journaled on the frame, a pair of spaced parallel arms journaled on the end of the counter-shaft, a stub-shaft journaled in the free ends of the arms, a gear-wheel keyed to the counter-shaft, a gear-wheel secured to the stub-shaft, said gear-wheels being between the arms and meshing with each other, a pitman rigid with the stub-shaft, means for operating the pitman, and a driving connection between the counter-shaft and one of the axles.

JOHN WALTER FINCH.

Witnesses:
M. B. SMITH,
JACK STINSON.